(12) United States Patent
Berner et al.

(10) Patent No.: US 11,822,166 B2
(45) Date of Patent: Nov. 21, 2023

(54) POWER TRANSFER HINGE FOR PRIVACY GLAZING STRUCTURE

(71) Applicant: Cardinal IG Company, Eden Prairie, MN (US)

(72) Inventors: Eric Berner, Ramsey, MN (US); Zachary Franz, St. Louis Park, MN (US)

(73) Assignee: Cardinal IG Company, Eden Prairie, MN (US)

( * ) Notice: Subject to any disclaimer, the term of this patent is extended or adjusted under 35 U.S.C. 154(b) by 80 days.

(21) Appl. No.: 17/389,720

(22) Filed: Jul. 30, 2021

(65) Prior Publication Data

US 2022/0035192 A1     Feb. 3, 2022

Related U.S. Application Data

(60) Provisional application No. 63/058,826, filed on Jul. 30, 2020.

(51) Int. Cl.
    *G02F 1/1333*     (2006.01)
    *G02F 1/1345*     (2006.01)
    (Continued)

(52) U.S. Cl.
    CPC ......... *G02F 1/13306* (2013.01); *E05D 15/30* (2013.01); *E06B 9/24* (2013.01); *G02F 1/133308* (2013.01); *E05Y 2201/624* (2013.01); *E05Y 2900/148* (2013.01); *E06B 2009/2464* (2013.01); *G02F 1/13452* (2013.01)

(58) Field of Classification Search
    CPC ............... G02F 1/13306; G02F 1/1333; G02F 1/133308; G02F 1/133332; G02F 1/1335; E05D 15/30; E05D 11/0081; E06B 9/24; E06B 2009/2464; E05Y 2201/624;
(Continued)

(56) References Cited

U.S. PATENT DOCUMENTS 1,551,332 A    8/1925   Schramm
1,744,040 A    1/1930   Elzer
(Continued)

FOREIGN PATENT DOCUMENTS

DE       9419315 U1    4/1995
EP       2264351 A1    12/2010
(Continued)

OTHER PUBLICATIONS

International Patent Application No. PCT/US2021/043855, International Search Report and Written Opinion dated Nov. 5, 2021, 13 pages.
(Continued)

*Primary Examiner* — Thoi V Duong
(74) *Attorney, Agent, or Firm* — Fredrikson & Byron, P.A.

(57) ABSTRACT

A hinge assembly includes a first arm, a second arm, a rotatable pin coupling, and a power transfer conduit. The rotatable pin coupling rotationally couples the second arm to the first arm. The first arm defines a first portion of a channel, the second arm defines a second portion of the channel, and rotatable pin coupling defines a third portion of the channel. The power transfer conduit extends through the first portion of the channel at the first arm, the third portion of the channel at the rotatable pin coupling, and the second portion of the channel at the second arm.

20 Claims, 13 Drawing Sheets

(51) Int. Cl.
*G02F 1/133* (2006.01)
*E05D 15/30* (2006.01)
*E06B 9/24* (2006.01)

(58) Field of Classification Search
CPC ......... E05Y 2900/148; E05Y 2400/654; E05Y 2800/272; E05Y 2800/298
See application file for complete search history.

(56) References Cited

U.S. PATENT DOCUMENTS

| | | | |
|---|---|---|---|
| 3,355,695 A | 11/1967 | Overesch |
| 3,508,361 A | 4/1970 | Ryder |
| 3,659,063 A | 4/1972 | Peterson |
| 3,842,386 A | 10/1974 | Suska |
| 3,848,361 A | 11/1974 | Foster et al. |
| 3,857,625 A | 12/1974 | Crane et al. |
| 3,860,312 A | 1/1975 | Gordon, Jr. |
| 4,116,514 A | 9/1978 | Lawrence |
| 4,140,357 A | 2/1979 | Wolz et al. |
| 4,412,711 A | 11/1983 | Suska |
| 4,445,299 A | 5/1984 | Lehikoinen et al. |
| 4,671,582 A | 6/1987 | Stromquist et al. |
| 4,839,939 A | 6/1989 | O'Brien |
| 5,267,866 A | 12/1993 | Swift et al. |
| 5,581,944 A | 12/1996 | Kombrekke et al. |
| 5,586,895 A | 12/1996 | Zehrung |
| 5,690,501 A | 11/1997 | Mader |
| 5,717,380 A | 2/1998 | Zehrung |
| 5,727,960 A | 3/1998 | Zehrung |
| 6,401,399 B1 | 6/2002 | Roche et al. |
| 6,581,332 B1 | 6/2003 | Kim |
| 6,812,407 B1 | 11/2004 | Opperman |
| 6,865,848 B2 | 3/2005 | Krimmel |
| 7,085,609 B2 | 8/2006 | Bechtel et al. |
| 7,259,359 B2 | 8/2007 | Davey et al. |
| 7,661,960 B2 | 2/2010 | Tanoi et al. |
| 8,448,382 B2 | 5/2013 | Rodgers et al. |
| 8,650,714 B2 | 2/2014 | Staude |
| 8,683,745 B2 | 4/2014 | Artwohl et al. |
| 9,019,588 B2 | 4/2015 | Brown et al. |
| 9,052,536 B2 | 6/2015 | Artwohl et al. |
| 9,155,405 B2 | 10/2015 | Artwohl et al. |
| 9,504,338 B2 | 11/2016 | Artwohl et al. |
| 9,825,443 B2 | 11/2017 | Shah et al. |
| 9,894,717 B2 | 2/2018 | Ash, Jr. et al. |
| 9,920,560 B2 | 3/2018 | Gipson et al. |
| 9,970,224 B2 | 5/2018 | Gompper et al. |
| 2014/0021903 A1 | 1/2014 | Seiling |
| 2016/0344148 A1 | 11/2016 | Mullins et al. |
| 2017/0170776 A1 | 6/2017 | Janowski |
| 2017/0250163 A1 | 8/2017 | Wilbur et al. |
| 2018/0307111 A1 | 10/2018 | Le Houx et al. |
| 2019/0137796 A1 | 5/2019 | Bjergaard et al. |
| 2019/0346710 A1 | 11/2019 | Schleder et al. |

FOREIGN PATENT DOCUMENTS

| | | |
|---|---|---|
| GB | 1096733 A | 12/1967 |
| KR | 1020200067415 A | 6/2020 |

OTHER PUBLICATIONS

Alvelid et al., "Development of a Concealed Power and Signal Transfer System for Sliding Doors," Master Thesis, Lund University, Department of Design Sciences, 2019, 111 pages.

POWER TRANSFER HINGE FOR PRIVACY GLAZING STRUCTURE

RELATED MATTERS

This application claims the benefit of U.S. Provisional Patent Application No. 63/058,826, filed Jul. 30, 2020, the contents of which are incorporated herein by reference.

TECHNICAL FIELD

This disclosure relates to hinge assemblies that can accommodate one or more power transfer components and, more particularly, hinge assemblies for convey electrical power between an electrical source and a privacy glazing structure.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In practice, an electrically controllable optically active privacy structure may be installed and connected to an energy source to provide power for controlling the structure. Certain structures, such as doors and windows, are designed with one or more movable panes relative to a surrounding stationary frame. It can be challenging to provide power to these structures because the portion of the structure to which power is supplied is not fixed but instead moves between various positions as the structure is opened and closed.

SUMMARY

In general, embodiments set forth in this disclosure are directed to hinge assemblies that can both move a window assembly coupled thereto and accommodate one or more power transfer components for conveying power to the window assembly. Various embodiments disclosed herein include hinge assemblies that accommodate one or more electrical wires such that these hinge assemblies can serve (e.g., via the one or more electrical wires) to convey electrical potential between an electrical source and an electrical receiving device, such as a window assembly movably coupled to the hinge assembly.

Hinge assemblies disclosed herein can be useful for facilitating power conveyance between an electrical power source and an object that receives electrical power and is moved by the hinge assembly. For example, the hinge assembly can be configured to move a privacy glazing structure that is, for instance, movably coupled to the hinge assembly, and the hinge assembly can be configured to convey power to and/or from the privacy glazing structure. As one specific such example, the hinge assembly can be configured to pivot the privacy glazing structure relative to a frame adjacent the privacy glazing structure. The movable privacy glazing structure can be implemented in the form of a window (e.g., a casement window), door, skylight, interior partition, or yet other structure where controllable visible transmittance is desired. Supplying power from an energy source to a movable privacy glazing structure can involve additional considerations, including, for example, how to supply power to the movable privacy glazing structure in each of the positions to which it is movable as well as how to supply power to the movable privacy glazing structure as it actively moves (e.g., pivots) from one position to another. Moreover, the configuration used to supply power to the movable privacy glazing structure should not prevent the movable privacy glazing structure from moving (e.g., pivoting) between its various positions.

Hinge assembly embodiments disclosed herein can be configured to convey electrical power between a power source (e.g., external to the hinge assembly) and the movable privacy glazing structure to enable the privacy glazing structure to be electrically driven by the electrical power conveyed from the power source via the hinge assembly. For example, various hinge assembly embodiments disclosed herein can make use of one or more hinge assembly components that are configured to facilitate, at least in part, movement of the movable privacy glazing structure to also convey power between the energy source and the movable privacy glazing structure. In this way, hinge assembly embodiments disclosed herein can be configured to both move the movable privacy glazing structure between two or more positions and supply power to and/or from the movable privacy glazing structure which can facilitate controlled optical transmission at the movable privacy glazing structure. As such, hinge assemblies disclosed herein can provide an efficient power conveyance mechanism by facilitating the dual functions of power conveyance and privacy glazing structure movement.

One embodiment includes a hinge assembly. This hinge assembly embodiment includes a first arm, a second arm, a rotatable pin coupling, and a power transfer conduit. The rotatable pin coupling rotationally couples the second arm to the first arm. The first arm defines a first portion of a channel, the second arm defines a second portion of the channel, and rotatable pin coupling defines a third portion of the channel. The power transfer conduit extends through the first portion of the channel at the first arm, the third portion of the channel at the rotatable pin coupling, and the second portion of the channel at the second arm.

In a further embodiment of this hinge assembly, the rotatable pin coupling is configured to allow rotation of the second arm relative to the first arm about a rotational axis that is defined at the rotatable pin coupling. The power transfer conduit can extend along the rotational axis as the power transfer conduit extends through the third portion of the channel at the rotatable pin coupling. The power transfer conduit can change elevation relative to the rotational axis as the power transfer conduit extends along the rotational axis. The rotatable pin coupling can include a first pin and a second pin that is coupled to the first pin, and the power transfer conduit can extend within each of the first pin and the second pin as the power transfer conduit extends along the rotational axis. The power transfer conduit can extend through the first arm at a first orientation that is perpendicular to the rotational axis, extend through and within the rotatable pin coupling at a second orientation that is perpendicular to the first orientation, and extend through the second arm at the first orientation that is perpendicular to the rotational axis. The power transfer conduit can exit the first portion of the channel at the first arm and enter the third portion of the channel at the rotatable pin coupling at a first angular orientation, relative to the rotational axis, and the power transfer conduit can exit the third portion of the channel at the rotatable pin coupling and enter the second portion of the channel at the second arm at a second angular orientation, relative to the rotational axis, that is different than the first angular orientation.

In a further embodiment of this hinge assembly, the first arm includes a first arm length, a first arm height, and a first arm width. The first arm length can be at least two times greater than each of the first arm height and the first arm width. And, the second arm includes a second arm length, a second arm height, and a second arm width. The second arm length can be at least two times greater than each of the second arm height and the second arm width.

In a further embodiment of this hinge assembly, the first portion of the channel defined at the first arm can include a first channel opening and a first arm first end channel portion extending in a first direction, a first arm mid-channel portion extending in a second direction that is different than the first direction, and a first arm first channel directional change portion interconnecting the first arm mid-channel portion to the first arm first end channel portion. And, the second portion of the channel defined at the second arm can include a second channel opening and a second arm second end channel portion extending in the first direction, a second arm mid-channel portion extending in the second direction that is different than the first direction, and a second arm second channel directional change portion interconnecting the second arm mid-channel portion to the second arm second end channel portion. The first channel opening and the first arm first end channel portion can be oriented at an obtuse angle relative to the first arm mid-channel portion, and the second channel opening and the second arm second end channel portion can be oriented at an obtuse angle relative to the second arm mid-channel portion.

In a further embodiment of this hinge assembly, the power transfer conduit can include at least two electrical wires that are independently insulated.

In further embodiment of this hinge assembly, the first arm can further include a channel opening and a coupling aperture at an end portion of the first arm opposite the rotatable pin coupling. The channel opening can form at least a part of the first portion of the channel and be configured to receive the power transfer conduit. The coupling aperture can be configured to receive a first arm coupling element for securing the hinge assembly to a support structure.

Another embodiment includes an electrically dynamic system. This system includes a first pane of transparent material, a second pane of transparent material, and electrically controllable optically active material, and a hinge assembly. The electrically controllable optically active material is positioned between the first pane of transparent material and the second pane of transparent material, and the electrically controllable optically active material is positioned between a first electrode layer and a second electrode layer. The hinge assembly includes a first arm, a second arm, a rotatable pin coupling, and a power transfer conduit. The rotatable pin coupling rotationally couples the second arm to the first arm. The first arm defines a first portion of a channel, the second arm defines a second portion of the channel, and rotatable pin coupling defines a third portion of the channel. The power transfer conduit extends through the first portion of the channel at the first arm, the third portion of the channel at the rotatable pin coupling, and the second portion of the channel at the second arm. The power transfer conduit is electrically coupled to the electrically controllable optically active material.

In a further embodiment of this system, the first pane of transparent material, the second pane of transparent material, and the electrically controllable optically active material are coupled to the second arm. The rotatable pin coupling can be configured to allow rotation of the second arm relative to the first arm about a rotational axis that is defined at the rotatable pin coupling. The power transfer conduit can extend along the rotational axis as the power transfer conduit extends through the third portion of the channel at the rotatable pin coupling. The power transfer conduit can change elevation relative to the rotational axis as the power transfer conduit extends along the rotational axis. The power transfer conduit can extend through the first arm at a first orientation that is perpendicular to the rotational axis, extend through and within the rotatable pin coupling at a second orientation that is perpendicular to the first orientation, and extend through the second arm at the first orientation that is perpendicular to the rotational axis. The power transfer conduit can exit the first portion of the channel at the first arm and enter the third portion of the channel at the rotatable pin coupling at a first angular orientation, relative to the rotational axis. And, the power transfer conduit can exit the third portion of the channel at the rotatable pin coupling and enter the second portion of the channel at the second arm at a second angular orientation, relative to the rotational axis, that is different than the first angular orientation.

In a further embodiment of this system, the first arm includes a first arm length, a first arm height, and a first arm width. The first arm length can be at least two times greater than each of the first arm height and the first arm width. And, the second arm includes a second arm length, a second arm height, and a second arm width. The second arm length can be at least two times greater than each of the second arm height and the second arm width.

The details of one or more examples are set forth in the accompanying drawings and the description below. Other features, objects, and advantages will be apparent from the description and drawings, and from the claims.

5 with the power transfer conduits removed to show an embodiment of the channel defined at the second arm.

Figure 6:
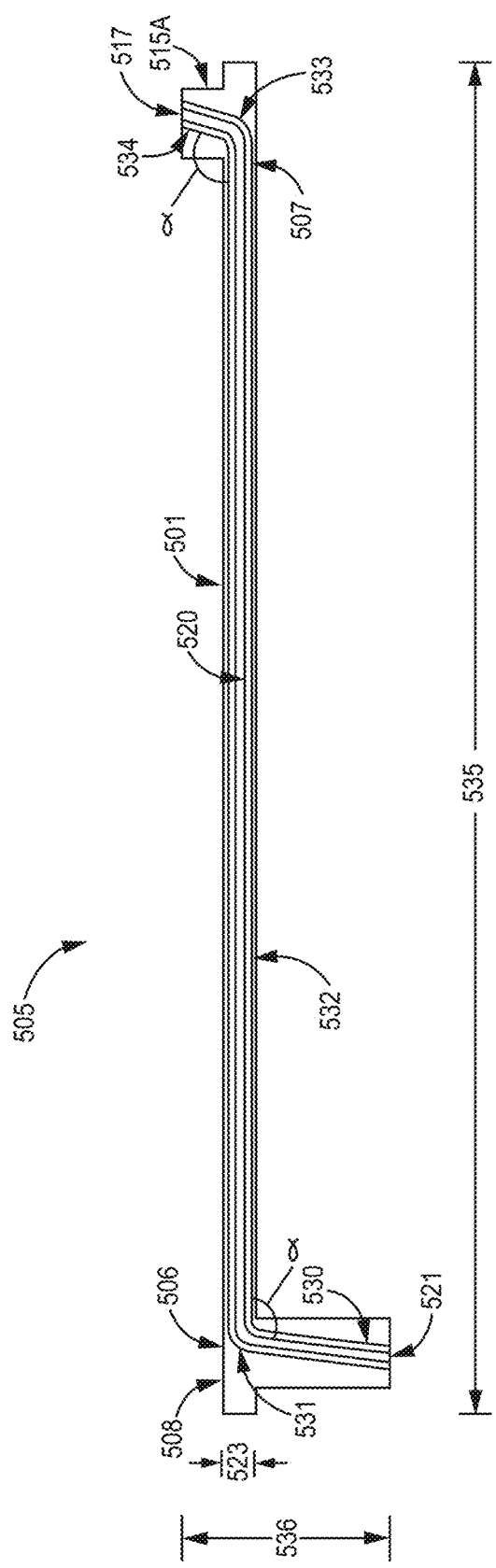
FIG. 6 is a longitudinal cross-sectional view of an embodiment of a first arm of the hinge assembly of FIG. 5 with the power transfer conduits removed to show an embodiment of a channel defined at the first arm.
Figure 8:
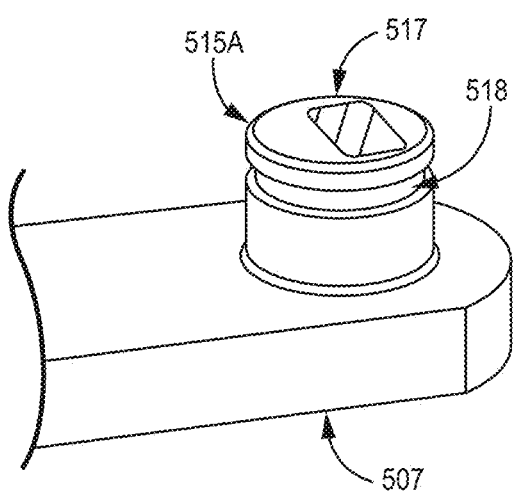

FIG. 8 is a perspective view of an embodiment of a pin at one end of the first arm of FIG. 6.

Figure 5:
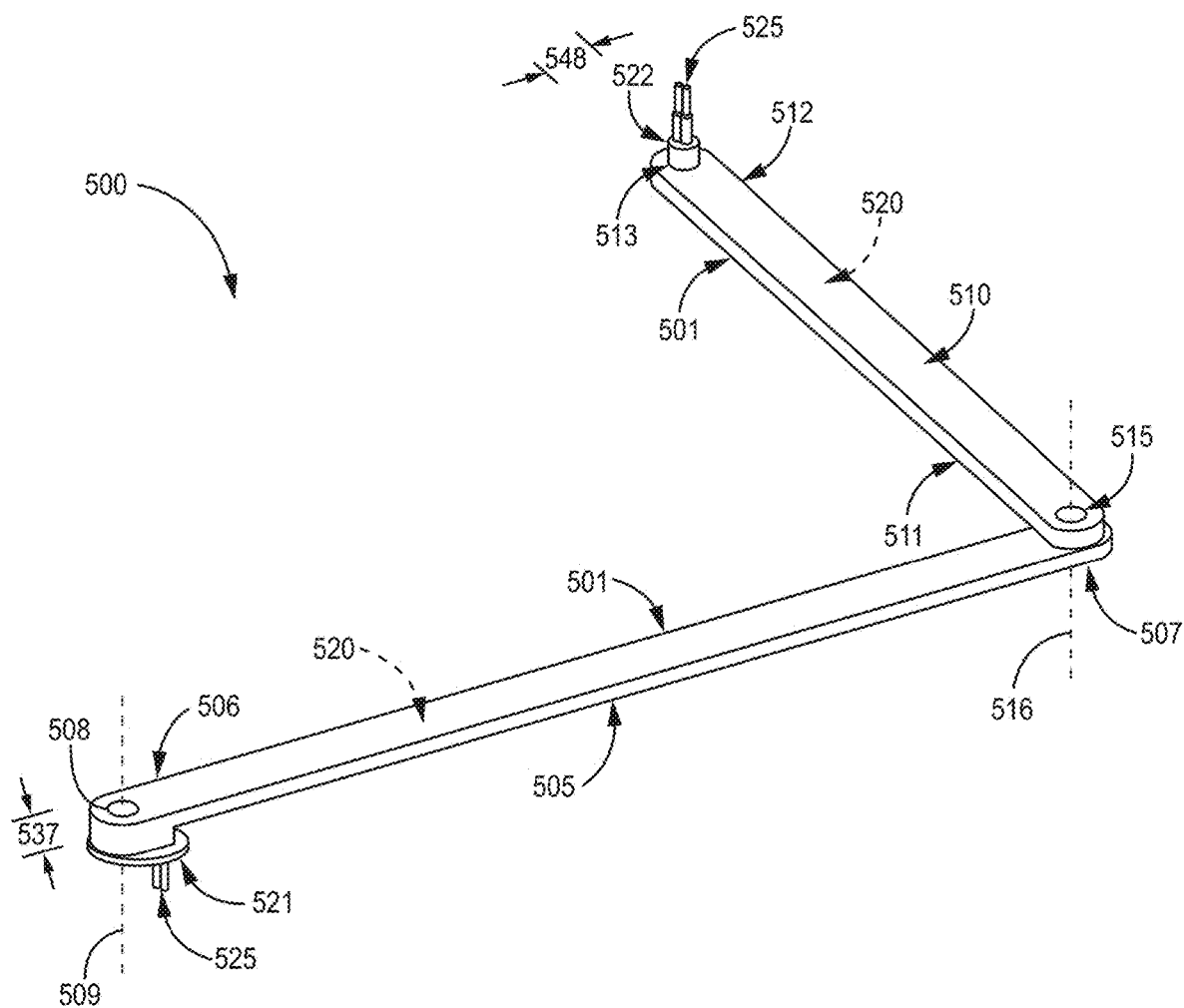
FIG. 5 is a perspective view of an embodiment of a hinge assembly.
Figure 9:
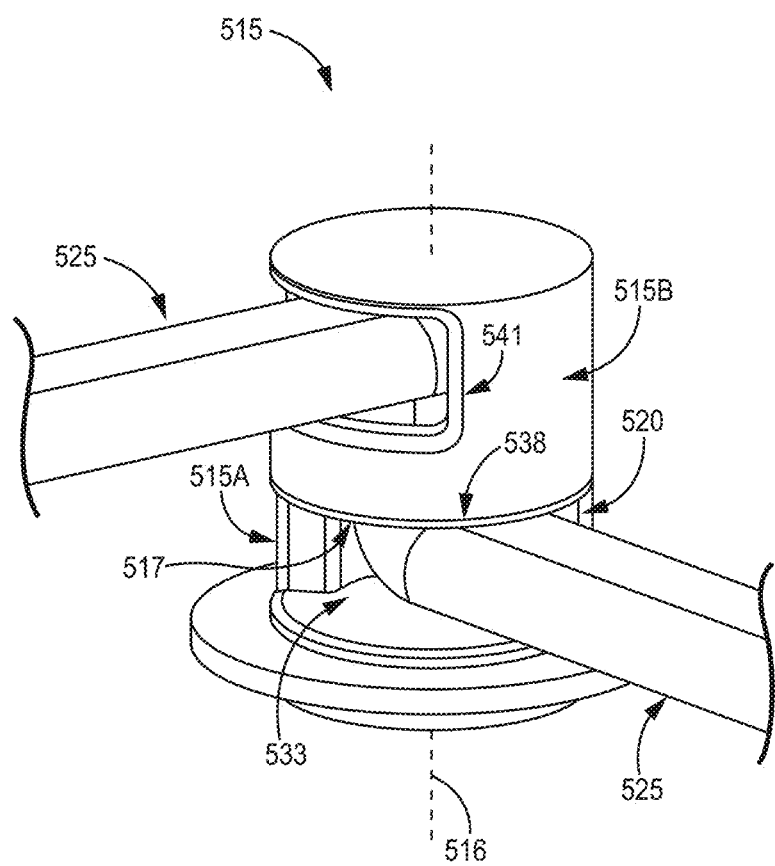

FIG. 9 is a perspective view of an embodiment of a rotatable pin coupling of the hinge assembly of FIG. 5 with first and second arms removed to show the rotatable pin coupling, and passed through power transfer conduits, in isolation.

Figure 10:
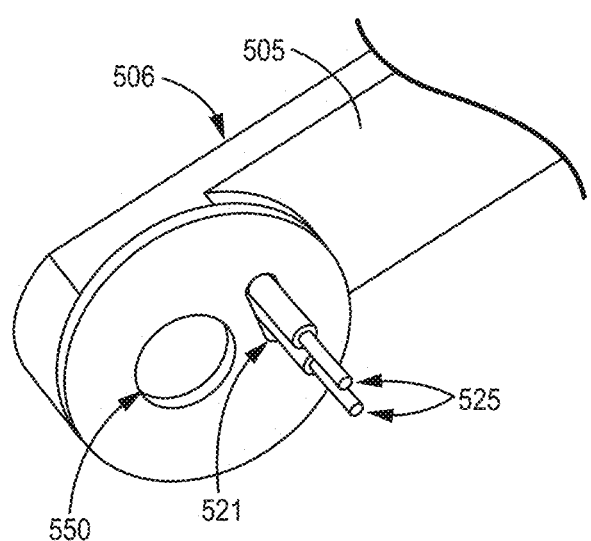

FIG. 10 is a bottom perspective view of an embodiment of another end of the first arm of FIG. 6.

Figure 11:
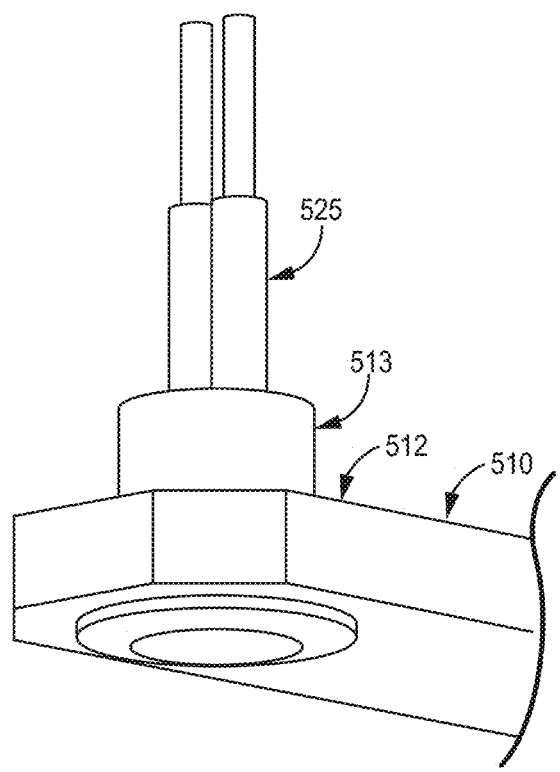

FIG. 11 is a side perspective view of an embodiment of an end of a second arm of the hinge assembly of FIG. 5 with an embodiment of a conveyance pin.

Figure 12:
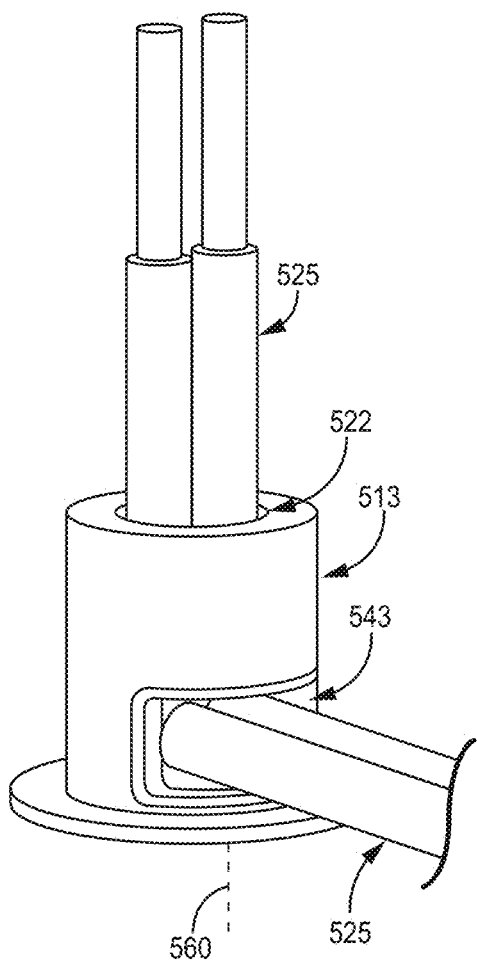

FIG. 12 is a side elevational view of the conveyance pin of FIG. 11 with passed through power transfer conduits.

Figure 13:
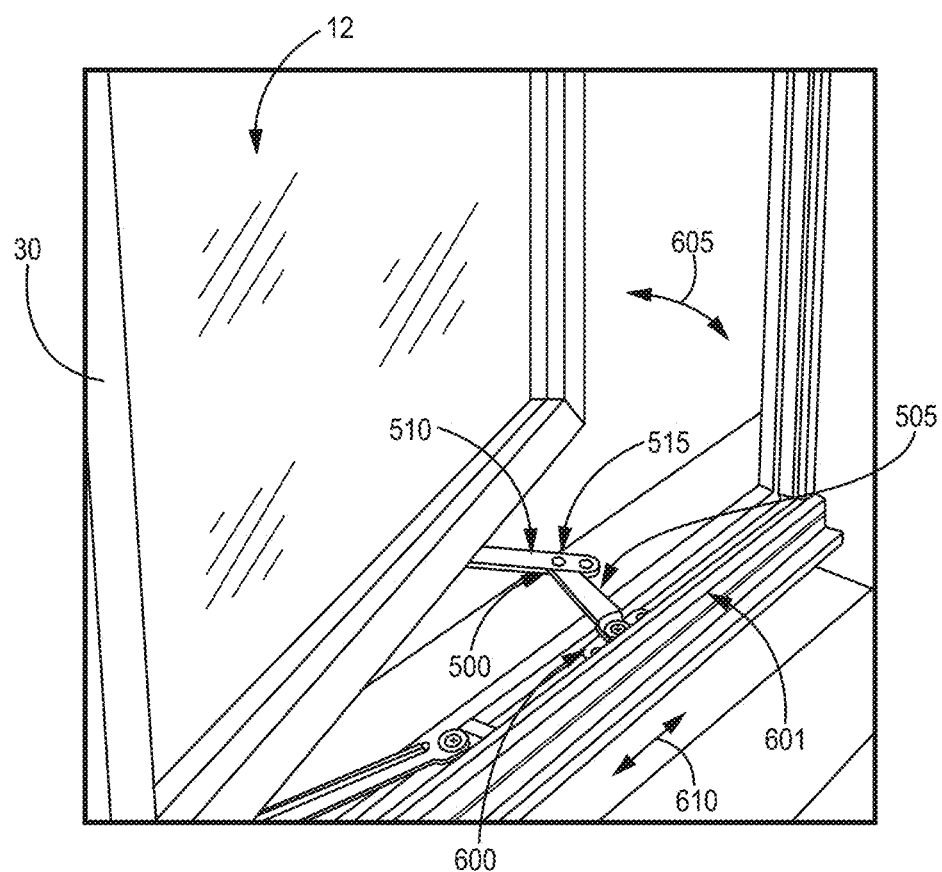

FIG. 13 is a perspective view of an embodiment of a privacy glazing structure coupled to a hinge assembly.

DETAILED DESCRIPTION

In general, this disclosure is directed to hinge assembly embodiments, and related structures that include a component, such as a privacy glazing structure, movably coupled to the hinge assembly, that can accommodate one or more power transfer components. For example, embodiments disclosed herein include hinge assemblies that accommodate one or more power transfer conduits (e.g., a pair of electrical wires) such that these hinge assemblies can serve (e.g., via the one or more power transfer conduits) to convey electrical potential between an electrical source and an electrical receiving device (e.g., the privacy glazing structure movably coupled to the hinge assembly).

In certain embodiments, one or more power transfer conduits can be guided through the hinge assembly and electrically coupled to a movable component attached to the hinge assembly so as to provide electrical power to the component movably (e.g., pivotably) coupled to the hinge assembly. For instance, a wire may be guided from a power source and/or an electrical driver through the hinge assembly and to an optical structure in a window or door assembly, such as an electrically controllable optically active material that provides controlled transition between a privacy or scattering state and a visible or transmittance state. The electrical driver may receive power from a power source, such as a rechargeable and/or replaceable battery and/or wall or mains power source. The electrical driver can condition the electricity received from the power source, for instance, by changing the frequency, amplitude, waveform, and/or other characteristic of the electricity received from the power source. The electrical driver can deliver the conditioned electrical signal to electrodes that are electrically coupled to the optically active material. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

By utilizing a hinge assembly as described herein, one or more of (e.g., each of) the power source, the electrical driver, and the optical structure need not be physically located on the window or door assembly itself. Instead, for instance, the power source and/or the electrical driver may be located in alternative locations. This can result in decreasing the weight, cost, and complexity of the window and/or door assembly, while also increasing the versatility of the overall system. For instance, rather than including a battery-operated power source or electrical driver in the window/door assembly itself, the optical structure may receive, through the hinge assembly, power from a source located elsewhere in a building. As such, the hinge assembly embodiments described herein can eliminate the need to monitor and replace batteries in the system and increase the convenience and footprint efficiency of the system. Even further, hinge assembly embodiments described herein may enable powered transfer hinges with very large gauge wires, which require a discrete yet efficient solution.

In some examples, the hinge assembly include a two-arm pivoting structure with multiple, different pivot points through which the power transfer conduit(s) pass through. For instance, an end-point of each of the two arms of the hinge assembly can include a coupling feature for coupling to an adjacent component while maintaining accommodation of the power transfer conduit(s). Each arm of the hinge assembly can define an internal channel configured to receive one or more power transfer conduits. In some examples, the hinge assembly may act as a dielectric jacket for un-insulated conductors. In some further examples, gasketing material may be used throughout the system to obtain an IP rating (ingress protection rating) for the entire system.

A hinge assembly according to this disclosure can be used in any desired application where a component is to be movably connected to the hinge assembly and power and/or electrical signals are desired to be conveyed to that component movably connected to the hinge assembly. One example application is a door or window assembly where a sash surrounding one or more glass sheets (e.g., an insulating privacy glazing unit) moves relative to a frame installed at an opening formed in a building wall. The sash can be hingedly connected to the frame using a hinge assemblies as described herein to allow the sash to move relative to the frame (e.g., for opening and closing the door or window) while also providing electrical connectively to the window assembly via the hinge assembly. Providing electrical connectivity through the hinge assembly can be useful to provide electrical potential to the window assembly regardless of the relative open or closed position of the sash to the frame. Example features of the window or door that may be powered through a hinge assembly according to the disclosure include, but are not limited to, movable components (e.g., movable blinds inside the insulating glazing unit surround by the sash), power to drive a motor that moves the sash relative to frame, and/or power to drive electrochemical transitions to control privacy and visibility through the door or window.

Figure 1:
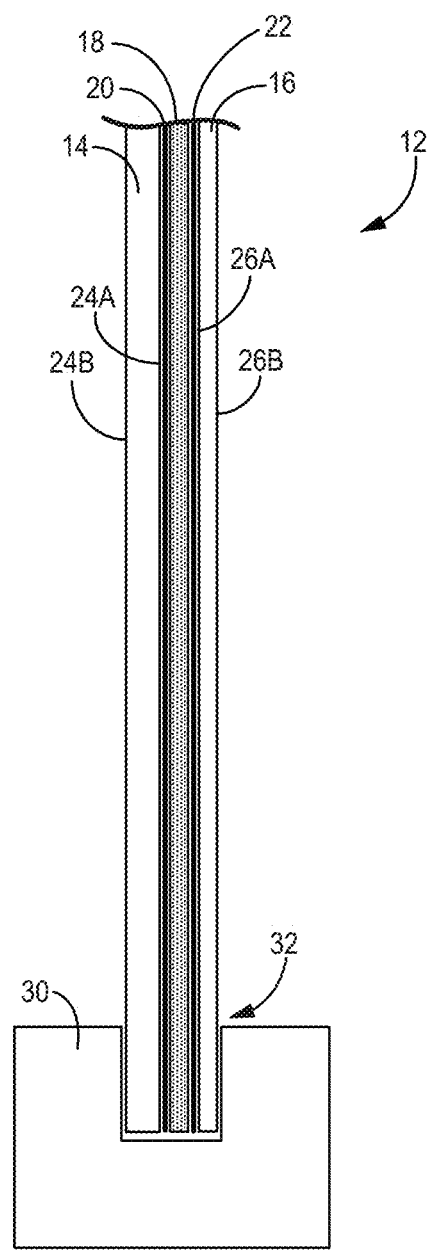
FIG. 1 is a side elevational view of one embodiment of a privacy glazing structure.

While a hinge assembly according to the disclosure can be used in a variety of different applications, FIG. 1 illustrates an example privacy glazing structure that can be movably coupled to any embodiment of a hinge assembly disclosed herein. In particular, FIG. 1 is a side elevational view of an embodiment of a privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

As described in greater detail below, a driver can be electrically connected to the first electrode layer 20 and second electrode layer 22, e.g., via wiring or other electrically conductive member extending between the driver and respective electrode layer. In operation, the driver can condition power received from a power source for controlling the layer of optically active material 18, e.g., to maintain a specific optical state or to transition from one optical state to another optical state. The driver can have a variety of different arrangements and configurations relative to a privacy structure as described in greater detail herein.

In accordance with the techniques described herein, hinge assembly embodiments disclosed herein, such as those illustrated as FIGS. 5-12, can be movably coupled to the overall window assembly to convey power between a power source and/or electrical driver and the privacy glazing structure 12. For instance, the hinge assembly can be configured to accommodate one of more power transfer conduits that can convey power to the privacy glazing structure 12, for instance to actuate the selective optical transparency element at the privacy glazing structure 12.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity or color tinting and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly oriented. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the layer of liquid crystal material.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but opaque and scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be blocked. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety factors, including the specific type of material selected for optically active material 18, the temperature of the material, the electrical voltage applied to the material, and the like.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directed on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a driver as described in greater detail below. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on inner faces 24A, 26A of the panes can form a cavity or chamber containing optically active material 18.

The panes of transparent material forming privacy glazing structure 12, including first pane 14 and second pane 16, and be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in U.S. Pat. No. 10,866,480, titled "HIGH PERFORMANCE PRIVACY GLAZING STRUCTURES" and issued Dec. 15, 2020, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure (which also may be referred to as a sash). In different examples, frame 30 may be fabricated from wood, metal, or a plastic material such as vinyl. Frame 30 may define a channel 32 that receives and holds the external perimeter edge of structure 12. The sightline through privacy glazing structure 12 is generally established as the location where frame 30 ends and visibility through privacy glazing structure 12 begins.

Figure 2:
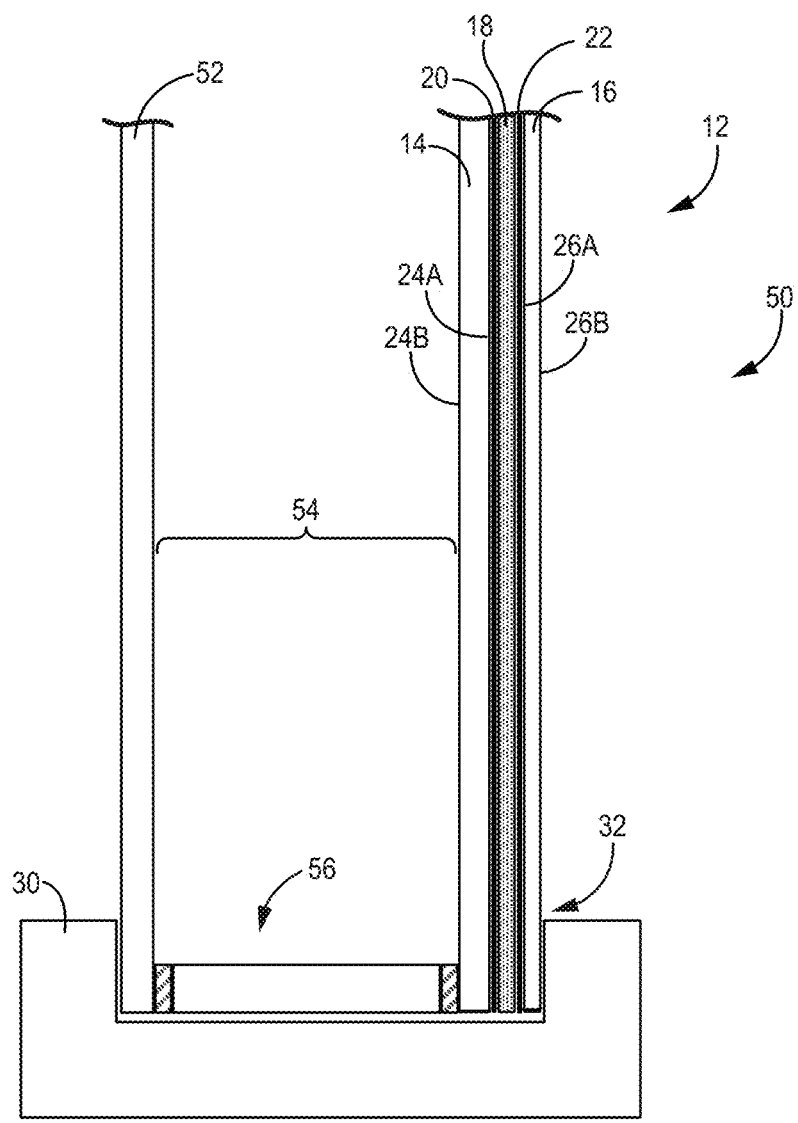
FIG. 2 is a side elevational view of another embodiment of a privacy glazing structure.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54 by a spacer 56. Spacer 56 may extend around the entire perimeter of multi-pane privacy glazing structure 50 to hermetically seal the between-pane space 54 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can be exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material. Useful glazing spacers are available commercially from Allmetal, Inc. of Itasca, Ill., U.S.A.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. Such a spacer is often referred to in commercial settings as swiggle spacer. In yet another example, spacer 56 may be formed from a foam material surrounded on all sides except a side facing a between-pane space with a metal foil. Such a spacer is commercially available from Edgetech under the trade name Super Spacer®. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on application, first pane of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. Useful low-emissivity coatings include the LoE-180™, LoE-272™, and LoE-366™ coatings available commercially from Cardinal CG Company of Spring Green, Wis., U.S.A. A photocatalytic coating, by contrast, may be a coating that includes a photocatalyst, such as titanium dioxide. In use, the photocatalyst may exhibit photoactivity that can help self-clean, or provide less maintenance for the panes. Advantageous photocatalytic coatings include the NEAT® coatings available from Cardinal CG Company.

In accordance with the techniques described herein, a hinge assembly, such as the hinge assemblies of any of FIGS. 5-12, may be movably coupled to the overall window assembly to convey electricity from the power source and/or electrical driver and to multi-pane privacy glazing structure 50. One or more power transfer conduits can extend from the power source or electric driver and through a channel defined by the hinge assembly to the window assembly to provide electricity for performing the optically selective transmissivity function described herein.

Figure 3:
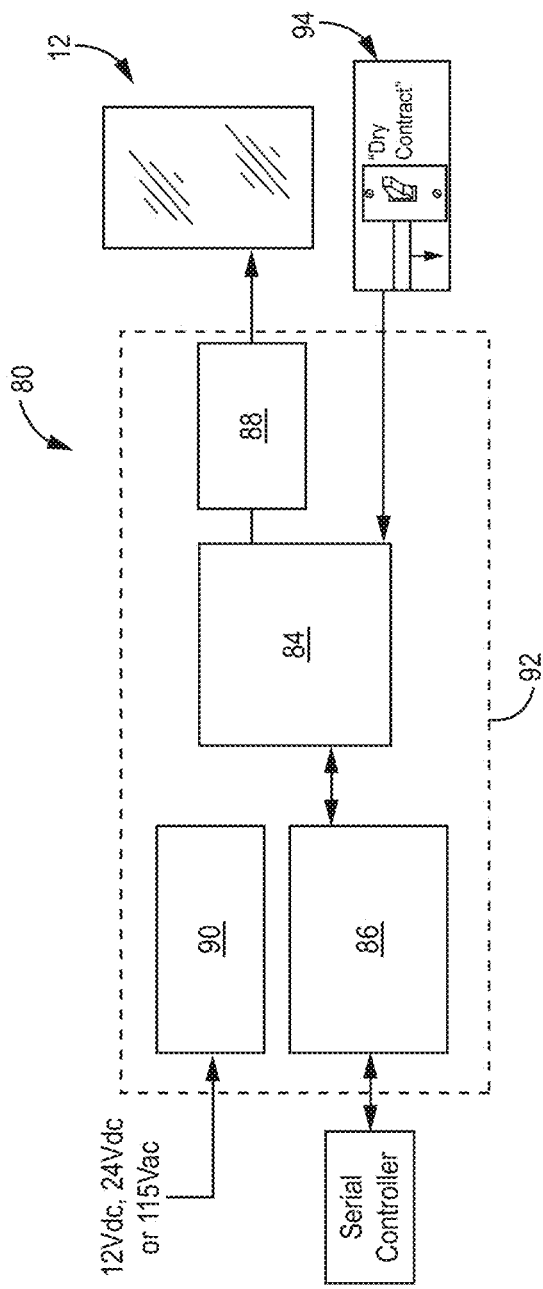
FIG. 3 is a block diagram of an example driver configuration that can be used to condition electricity supplied to a privacy glazing structure, such as that show in FIGS. 1 and 2.

As briefly mentioned above, the panes of transparent material forming privacy glazing structure 12, whether implemented alone or in the form of multiple-pane structure with a between-pane space, can carry a first electrode layer 20 and second electrode layer 22 for controlling optically active material 18. The first electrode layer 20 and second electrode layer 22 can be electrically coupled to a driver that conditions power received from a power source to control optical active material 18. FIG. 3 is a block diagram of an example driver configuration that can be used to condition electricity supplied to privacy glazing structure 12.

As shown in the example of FIG. 3, a driver 80 can be electrically coupled to privacy glazing structure 12 via an electrical linkage 82. Driver 80 can include a controller 84, a communication module 86, an output circuit 88, and a power source 90. Some or all of the components of driver 80 may be contained in a housing 92. Controller 84 can communicate with the other components of driver 80 to manage the overall operation of the driver. In some examples, controller 84 may receive input from a user interface and/or sensor to control conditioning of the electrical signal received from power source 90. Controller 84 may include a processor and memory. The processor can run software stored in memory to perform functions attributed to controller 84. The memory can provide non-transitory storage of software used by and data used or generated by controller 84.

Communication module 86 can be implemented using a wired and/or wireless interface to communicate between controller 84 and the external environment. Communication module 86 may be used to send status information from driver 80 to an external computing device and/or to receive information concerning how driver 80 should be controlled. For example, driver 80 may be communicatively coupled via communication module 86 with a smart home computing system and/or a wireless module that would enable smart device control remotely. Example communication protocols that communication module 86 may communicate over include, but are not limited to, Ethernet (e.g., TCP/IP), RS232, RS485, and common bus protocols (e.g., CAN).

Output circuit 88, which may also be referred to as a driver circuit, can take control signals from controller 84 and power signals from power source 90 and generate a conditioned electrical signal supplied to privacy glazing structure 12. For example, the control signals received from controller 84 may dictate the frequency, amplitude, waveform, and/or other signal properties of the conditioned electrical signal to be supplied to privacy glazing structure 12 to control optically active material 18. Output circuit 88 can condition the power signal received from power source 90 using the control signal information received from controller 84. In some examples, output circuit 88 may generate feedback signals returned to controller 84 providing information for maintenance and/or status monitoring.

Power source 90 may be implemented using any source or combination of sources of electrical power to control privacy glazing structure 12. Power source 90 may be a battery source having a finite capacity and/or be a continuous source having an infinite capacity (e.g., wall or mains power, a direct current power source such as power over Ethernet (POE)). When configured with one or more batteries, the batteries may be rechargeable and/or replaceable. Examples of power source 90 include, but are not limited to, 115 Vac or 240 Vac, 12 Vdc, 24 Vdc, and combinations thereof. Power source 90 may or may not be located inside of driver housing 92, as illustrated in FIG. 3, depending on the manner in which the power source is implemented in the system.

To control driver 80, the privacy system may include a user interface 94. User interface 94 may be wired or wirelessly connected to controller 84. User interface 94 may include a switch, buttons, touch screen display, and/or other features with which a user can interact to control privacy glazing structure 12. In operation, a user may interact with user interface 94 to change the degree of privacy provided by privacy glazing structure 12. For example, the user may interact with user interface 94 to change privacy glazing structure 12 from a scattering or privacy state to a transparent or visible state, or vice versa, and/or the user may change to degree of privacy provided along a continuously variable spectrum. Information received from user interface 94 can be used by controller 84, e.g., with reference to information stored in memory, to control the electrical signal supplied to privacy glazing structure 12 by driver 80.

In operation, driver 80 can condition power received from power source 90 to supply alternating current to the privacy glazing structure (e.g., the electrode layers of the privacy glazing structure) or, in other examples, direct current. Electricity can be conveyed from power source 90 (optionally being conditioned by driver 80) to the privacy glazing structure via wiring (e.g., two or more individual wires, including a positive and a negative wire). Each feature described as a wire may include an electrical conductor (e.g., copper), which may be surrounded by an insulative jacket.

In accordance with the techniques described herein, a hinge assembly, such as the hinge assemblies of any of FIGS. 5-12, can be movably coupled to the overall window assembly to provide electricity from power source 90 and/or electrical driver 80 and to privacy glazing structure 12.

Figure 4:
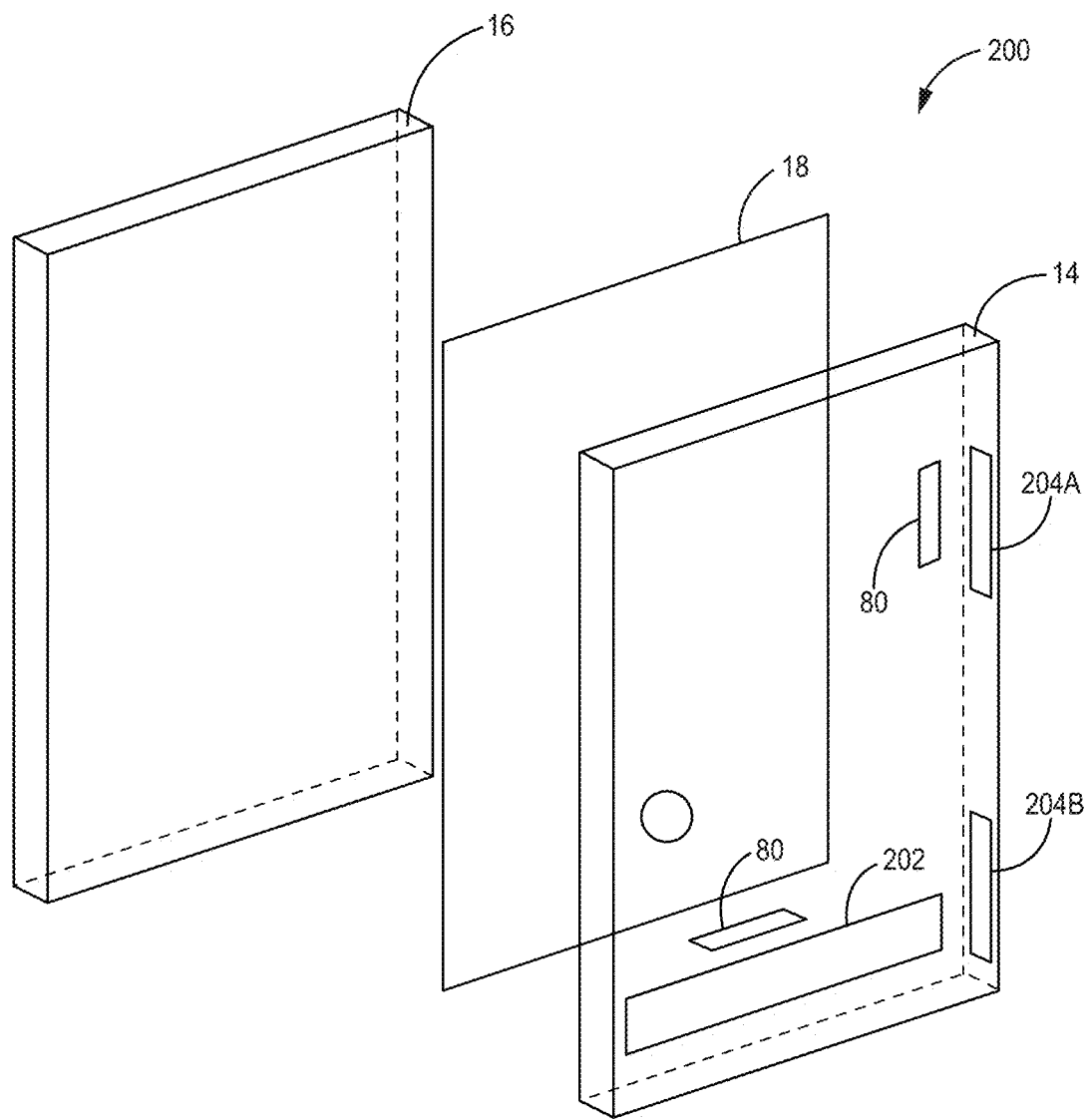
FIG. 4 is a perspective view of an embodiment of a privacy structure illustrating exemplary driver mounting configurations.

FIG. 4 is an exploded perspective view of an example privacy door 200 that may utilize an example hinge assembly according to the disclosure. Privacy door 200 can be constructed using the arrangement and configuration of components discussed above with respect to privacy glazing structure 12 (FIGS. 1 and 2). For example, privacy door 200 may include a first pane of transparent material 14, a second pane of transparent material 16, and an electrically controllable optically active material 18 positioned between the first and second panes of transparent material. The first pane of transparent material 14 can carry a first electrode layer, and the second pane of transparent material 16 can carry a second electrode layer, as discussed with respect to privacy glazing structure 12. Privacy door 200 may be visually transparent, or see through, when electrically controllable optically active material 18 is in a transparent state but optically obscured when the optically active material is in a darkened or privacy state.

To provide a location to discretely position driver 80 that is electrically coupled to the electrode layers carried by the panes of transparent material, privacy door 200 can include an optically opaque panel covering an access opening to an interior space formed within the door. For example, privacy door 200 in the example of FIG. 4 is illustrated as include a kick plate 202 positioned across the lower quadrant of the door. Privacy door 200 is also shown as having a hinge plate 204 which, in the illustrated example, is depicted as a top hinge plate 204A and bottom hinge plate 204B. The hinge plates can define mating surfaces where privacy door 200 is joined via hinge(s) to a door frame.

In some implementations, a hinge assembly, such as the hinge assemblies of any of FIGS. 5-12, may be installed to provide electrical communication to and/or through hinge plate 204, allowing electricity to travel from the power source and/or electrical driver to privacy door 200.

In the example of FIG. 4, a cavity may be formed in first pane of transparent material 14 and/or privacy door 200 that is covered by and/or accessible through a corresponding optically opaque panel. Driver 80 can be within the cavity and electrically connected to the electrode layers carried by the transparent panels, e.g., using electrical conductors extending from the driver to each respective electrode layer. The cavity formed within privacy door 200 may form the driver housing 92 in which various components defining the driver are inserted and housed. Alternatively, driver 80 may include a separate driver housing 92 that is insertable into cavity. In either case, an optically opaque panel can be covered over the opening to discretely hide the driver within the opening. The optically opaque panel may be fabricated from a material that is not visually transparent, such as non-transparent glass (e.g., frosted glass), metal, non-transparent plastic, or other suitable material.

FIG. 5 is a perspective view of an embodiment of a hinge assembly 500. While the hinge assembly 500 is described in the illustrated embodiment as coupling one fixed object (e.g., a frame) and one movable object (e.g., a window assembly movable (e.g., pivotable) relative to the frame), the hinge assembly 500 can also be a hinge assembly connecting two movable objects.

The illustrated embodiment of the hinge assembly 500 includes a first arm 505 and a second arm 510. The first arm 505 can include a first arm first end 506 and a first arm second end 507, and the second arm 510 can include a second arm first end 511 and a second arm second end 512. The first arm 505 and the second arm 510 can be movable relative to one another. For example, the hinge assembly 500 can include a rotatable pin coupling 515 that movably connects the first and second arms 505, 510. In one such example application, the first arm first end 506 can be coupled to a fixed object, such as a frame, via a first arm coupling element 508, and the first arm 505 can rotate about an axis 509 defined by the first arm coupling element 508. The first arm second end 507 and the second arm first end 511 can include the rotatable pin coupling 515, the first arm second end 507 can be movably coupled to the second arm first end 511 via the rotatable pin coupling 515. The rotatable pin coupling 515 can be configured to permit rotation of the second arm 510 relative to the first arm 505 about an axis 516 defined by the rotatable pin coupling 515. Thus, the hinge assembly 500 can be configured to facilitate rotation of the first arm 505 about the axis 509 and rotation of the second arm 510, relative to the first arm 505, about the axis 516. The second arm second end 512 can be coupled to an object, such as a window assembly (e.g., the privacy glazing structure described herein) and, as such, the object coupled to the second arm 512 can be moved with the second arm between various positions.

To facilitate power conveyance, a body 501 of the hinge assembly 500 can define a channel 520 that is configured to receive thereat one or more power transfer conduits 525. For example, the channel 520 can have a channel opening 521 at the first arm first end 506 and another channel opening 522 at the second arm second end 512. The channel opening 522, in the illustrated embodiment, can be defined at a conveyance pin 513 included at the second arm 510. The channel 520 can extend within the body 501 from the channel opening 521, at the first arm 505, to the channel opening 522, at the second arm 510. The one or more power transfer conduits 525 can be positioned within the channel 520 and thus likewise extend from the channel opening 521, at the first arm first end 506, to the channel opening 522, at the second arm second end 512. In this way, the one or more power transfer conduits 525 can be configured to convey power from a power source (e.g. electrically connected to the one or more power transfer conduits 525 adjacent the first arm first end 506), through the body 501 of the hinge assembly 500, and out from the body 501 to a privacy glazing structure that is coupled to the second arm 510.

FIG. 6 shows a longitudinal cross-sectional view of the first arm 505 of the hinge assembly 500. In FIG. 6, the power transfer conduits have been removed for ease in showing the channel 520 defined at the first arm 505. As illustrated in FIG. 6, at the first arm 505, the channel 520 extends from the channel opening 521, at the first arm first end 506, to the first arm second end 507. More specifically, at the first arm second end 507, the channel 520 extends through a first pin 515A, of the rotatable pin coupling 515, to a pin opening 517 at the first pin 515A. Thus, at the first arm 505, the channel 520 extends within the body 501 from the channel opening 521 to the pin opening 517.

In the illustrated embodiment, the channel 520 has multiple channel regions. Namely, at the first arm 505, the channel 520 can have a first arm first end channel portion 530, a first arm first channel directional change portion 531, a first arm mid-channel portion 532, a first arm second channel directional change portion 533, and a first arm second end channel portion 534. The channel opening 521 can be located at the first arm first end channel portion 530, and the first pin 515A and pin opening 517 can be at the first arm second end channel portion 534. The first arm first end channel portion 530 can extend in a first direction from the channel opening 521 toward the first arm mid-channel portion 532, and the first arm mid-channel portion 532 can extend in a second direction that is different than the first direction in which the first arm first end channel portion 530. As such, the first arm first channel directional change portion 531 can define a change in direction of the channel 520 from the first direction to the second direction and, thereby, interconnect the first arm first end channel portion 530 and the first arm mid-channel portion 532. Likewise, the first arm second end channel portion 534 can extend in the first direction (e.g., the same direction in which the first arm first end channel portion 530 extends) from the first arm second channel directional change portion 533 to the pin opening 517. As such, the first arm second channel directional change portion 533 can define a change in direction of the channel 520 from the second direction of the first arm mid-channel portion 532 to the first direction of the first arm second end channel portion 534 and, thereby, interconnect the first arm mid-channel portion 532 and the first arm second end channel portion 534.

Each of the first arm first end channel portion 530 and the first arm second end channel portion 534 extend from the first arm mid-channel portion 532 at an angle α. In the illustrated embodiment, the angle α is more than ninety degrees and less than one hundred and eighty degrees (i.e. an obtuse angle). As a result, the pin opening 517 can be skewed and non-perpendicular relative to a longitudinal axis of the first arm mid-channel portion 532, and the channel opening 521 can be skewed and non-perpendicular relative to the longitudinal axis of the first arm mid-channel portion 532. The angle α as an obtuse angle can be useful in facilitating a change in direction, via the respective first arm first channel directional change portion 531 and first arm second channel directional change portion 533, from the first direction, along which the first arm first end channel portion 530 and the first arm second end channel portion 534 extend, to the second direction, along which the first arm mid-channel portion 532 extends. Namely, the obtuse angle α can provide a relatively more gradual bend at the respective first arm first channel directional change portion 531 and first arm second channel directional change portion 533 which can help to decrease forces imparted by the walls of the body 501, defining the channel 520, on the one or more power transfer conduits received within the channel 520. And, the obtuse angle α can make it easier to place the one or more power transfer conduits within the channel 520.

In the illustrated embodiment, the first arm 505 can define a first arm length 535, a first arm height 536, and a first arm width 537. The first arm length 535 can be greater than both the first arm height 536 and the first arm width 537. For example, the first arm length 535 can be two times, three times, four times, five times, or ten times greater than the first arm height 536, and the first arm length 535 can be two times, three times, four times, five times, or ten times greater than the first arm width 537. The second direction, along which the first arm mid-channel portion 532 extends, can be in the direction of the first arm length 535, and the first direction, along which the first arm first end channel portion 530 and the first arm second end channel portion 534 extend, can be generally in the direction of the first arm height 536 (and can be partially skewed relative to the direction of the first arm height 536 when the angle α is the obtuse angle. As shown in FIG. 6, the location of each of the first arm first channel directional change portion 531 and first arm second channel directional change portion 533 can be at a common elevation of the first arm height 536.

Figure 7:
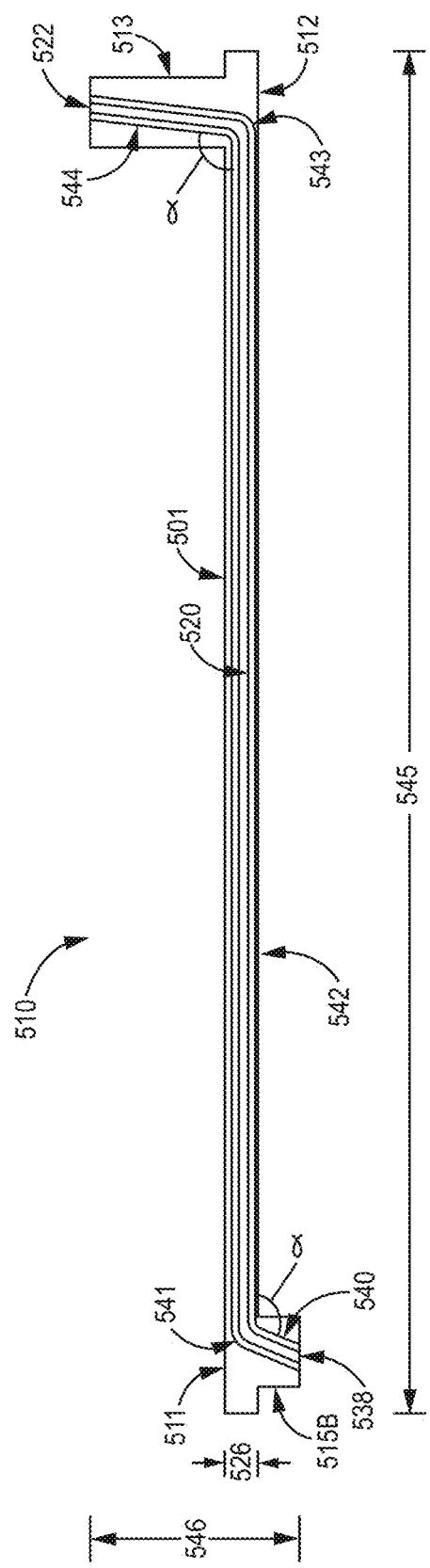
FIG. 7 is a longitudinal cross-sectional view of an embodiment of a second arm of the hinge assembly of FIG.

FIG. 7 shows a longitudinal cross-sectional view of the second arm 510 of the hinge assembly 500. Like FIG. 6, in FIG. 7 the power transfer conduits have been removed for ease in showing the channel 520 defined at the second arm 510. As illustrated in FIG. 7, at the second arm 510, the channel 520 extends from the second arm first end 511 to the channel opening 522, at the second arm second end 512. More specifically, at the second arm first end 511, the channel 520 extends through a pin opening 538 at a second pin 515B, of the rotatable pin coupling 515, to the channel opening 522, at the second arm second end 512. Thus, at the second arm 510, the channel 520 extends within the body 501 from the pin opening 538 to the channel opening 522.

The channel 520 can be defined at the second arm 510 in the same, or similar, manner as the channel 520 is shown and described for the first arm 505, though the channel 520 as defined at the second arm 510 can have such features in a generally inverse manner given that the second arm 510 can define the channel 520 thereat as a mirror image of the channel 520 as defined at the first arm 505.

In the illustrated embodiment of FIG. 7, the channel 520 has multiple channel regions. Namely, at the second arm 510, the channel 520 can have a second arm first end channel portion 540, a second arm first channel directional change portion 541, a second arm mid-channel portion 542, a second arm second channel directional change portion 543, and a second arm second end channel portion 544. The second pin 515B and the pin opening 538 can be located at the second arm second end portion 540, and the channel opening 522 can be located at the second arm second end channel portion 544. The second arm first end channel portion 540 can extend in the first direction from the pin opening 538 toward the second arm mid-channel portion 542, and the second arm mid-channel portion 542 can extend in the second direction that is different than the first direction in which the second arm first end channel portion 540 extends. As such, the second arm first channel directional change portion 541 can define a change in direction of the channel 520 from the first direction to the second direction and, thereby, interconnect the second arm first end channel portion 540 and the second arm mid-channel portion 542. Likewise, the second arm second end channel portion 544 can extend in the first direction (e.g., the same direction in which the second arm first end channel portion 540 extends) from the second arm second channel directional change portion 543 to the channel opening 522. As such, the second arm second channel directional change portion 543 can define a change in direction of the channel 520 from the second direction of the second arm mid-channel portion 542 to the first direction of the second arm second end channel portion 544 and, thereby, interconnect the second arm mid-channel portion 542 and the second arm second end channel portion 544.

Each of the second arm first end channel portion 540 and the second arm second end channel portion 544 can extend from the second arm mid-channel portion 542 at the angle α as described previously with respect to the first arm 505. And, the second arm 510 can define a second arm length 545, a second arm height 546, and a second arm width 547. The second arm length 545, the second arm height 546, and the second arm width 547 can be the same as that described for, respectively, the first arm length 535, the first arm height 536, and the first arm width 537. In some examples, the channel 520 can have a channel height 523, at each of the first arm mid-channel portion 532 and the second arm mid-channel portion 542, that is greater than 75%, greater than 80%, greater than 85%, greater than 90%, or greater than 95% of the arm height at the respective first and second arm mid-channel portions 532, 542.

In one example, the first arm 505 and/or the second arm 510 can be formed via a casting, molding, or similar integrated manufacturing process with the power transfer conduit(s) 525. For instance, at a first step in the process, the power transfer conduit(s) 525 can be placed relative to a cast or mold corresponding to the body of the first arm 505 and/or the second arm 510. As one specific such example, the case or mold can include an interior channel wall that defines the channel 520 through the cast or mold corresponding to the body of the first arm 505 and/or the second arm 510, and the power transfer conduit(s) 525 can be placed within the interior channel wall of the cast or mold. At a second step in the process, liquid material can be placed at the cast or mold and around the power transfer conduit(s) 525 previously placed at the cast or mold. Then, at a third step in the process, the formed first arm 505 and/or second arm 510 can be removed from the cast or mold with the power transfer conduit(s) 525 located within the channel 520 of the first arm 505 and/or second arm 510. In this way, the first arm 505 and/or the second arm 510 can be made with the power transfer conduit(s) 525 located in the channel 520 via the power transfer conduit(s) 525 being cast or molded into the first arm 505 and/or the second arm 510, and thus, being cast or molded into the channel 520. In other examples, the first arm 505 and/or the second arm 510 can be formed via a stamping, welding, forming or other similar manufacturing process.

FIG. 8 shows a perspective view of an embodiment of the first pin 515A at the first arm second end 507. The second pin 515B at the second arm first end 511 can the same as, or similar to, that show and described here for the first pin 515A. The first and second pins 515A, 515B can be configured to rotationally couple to one another to create the rotatable pin coupling, as will be further shown as described with reference to FIG. 9. In one embodiment, the first and second pins 515A, 515B can be integral to the respective first and second arms 505, 510. In another embodiment, the first and second pins 515A, 515B can be press fit together to form the rotational coupling. In yet another embodiment, the first and second pins 515A, 515B can be snap fit together to form the rotational coupling. To help facilitate a snap fit to form the rotational coupling between the first and second pins 515A, 515B, the first pin 515A can include a snap groove 518 configured to receive a complementary snap fitting thereat on the second pin 515B. Reception of the complementary snap fitting at the snap groove 518 can cause the first and second pins 515A, 515B to be rotationally coupled together such that the second arm 510 can pivot about the axis 516 independent of the first arm 505.

FIG. 8 also shows the pin opening 517 at the first pin 515A. In some embodiments, the pin opening 517 can define a cross-sectional area (e.g., at the end of the first pin 515A) that is greater than 50%, greater than 60%, greater than 70%, greater than 75%, greater than 80%, greater than 85%, or greater than 90% of the cross-sectional area of the first pin 515A. As also seen here, to facilitate the angle α, the pin opening 517 can extend from the end of the first pin 515A in a direction toward the first arm mid-channel portion 532.

FIG. 9 shows a perspective view of the rotatable pin coupling 515 of the hinge assembly 500, with first and second arms 505, 510 removed to show, in isolation, the rotatable pin coupling 515 and passed through power transfer conduits 525. The first and second pins 515A, 515B are rotationally coupled together to form the rotatable pin coupling 515. In operation, the rotatable pin coupling 515 is configured to allow the second arm 510 to rotate about the axis 516 independent of the first arm 505. More specifically, in the illustrated embodiment, each of the first pin 515A and the second pin 515B can rotate together about the axis 516 with the second arm 510 and independent of the first arm 505.

The pin opening 517 at the first pin 515A interfaces with the pin opening 538 of the second pin 515B such that the channel 520 extends through the first pin 515A and the second pin 515B. In this way, the channel 520 is configured to allow the power transfer conduits 525 to extend along the first arm mid-channel portion 532 to the first arm second channel directional change portion 533, extend through the first pin 515A and into the second pin 515B via the pin opening 517 and the pin opening 538, extend through the second pin 515B and out through the second arm first channel directional change portion 541, and extend along the second arm mid-channel portion 542.

As shown in FIG. 9, the first arm second channel directional change portion 533, defining the power transfer conduit entry point into the first pin 515A, can be angularly offset from the second arm first channel directional change portion 541, defining the power transfer conduit exit point from the second pin 515B. For example, the power transfer conduit(s) 525 can enter the first pin 515A at an orientation that is generally horizontal, and thus perpendicular to the rotational axis 516, at a first angular location (e.g., "zero" degrees) relative to the rotational axis 516 of the rotatable pin coupling 515. Once the power transfer conduit(s) 525 is within the first pin 515A, the power transfer conduit(s) 525 can then intersect the rotational axis 516 and change orientation to be generally vertical and extending along the rotational axis 516 as the power transfer conduit(s) 525 extends through both the first pin 515A and the second pin 515B. Then, once the power transfer conduit(s) 525 is within the second pin 515B, the power transfer conduit(s) 525 can again change orientation to be generally horizontal, and thus perpendicular to the rotational axis 516, and diverge from the rotational axis 516 toward, and out from the second pin 515B, at the second arm first channel directional change portion 541. The power transfer conduit(s) 525 can exit the second pin 515B at a second angular location (e.g., approximately "thirty," "forty five," "sixty," "seventy five," or "ninety" degrees), different than the first angular location, relative to the rotational axis 516.

In addition to the described angular offset of the power transfer conduit(s) 525, the power transfer conduit(s) 525 can change elevation at the rotatable pin coupling 515. Namely, the power transfer conduit(s) 525 can enter the first pin 515A at a first elevation and exit the second pin 515B at a second elevation different from the first elevation. The power transfer conduit(s) 525 can change elevation from the first elevation to the second elevation where the power transfer conduit(s) 525 extend along the rotational axis 516 of the rotatable pin coupling 515. This can be the case because no pin is present at the rotational axis 516 of the rotatable pin coupling 515 and, thus, the power transfer conduit(s) 525 can extend along the rotational axis 516 to change elevation and/or angular location relative to the rotational axis 516.

The first arm second channel directional change portion 533, defining the power transfer conduit entry point into the first pin 515A, can have a different cross-sectional area than the second arm first channel directional change portion 541, defining the power transfer conduit exit point from the second pin 515B. For example, the first arm second channel directional change portion 533, defining the power transfer conduit entry point into the first pin 515A, can have a larger cross-sectional area than that of the second arm first channel directional change portion 541, defining the power transfer conduit exit point from the second pin 515B. This larger cross-sectional area of the first arm second channel directional change portion 533, defining the power transfer conduit entry point into the first pin 515A, can be useful in facilitating relative rotation of the second arm 510 relative to the first arm 505 at the rotatable pin coupling 515. In particular, with the power transfer conduit(s) 525 passing through the rotatable pin coupling 515, the relatively larger cross-sectional area of the first arm second channel directional change portion 533 can provide additional clearance for the power transfer conduit(s) 525 at the power transfer conduit entry point into the first pin 515A and, thereby, help to reduce instances where the presence of the power transfer conduit(s) 525 impede rotational of the rotatable pin coupling 515 about the rotational axis 516. For instance, the power transfer conduit(s) 525, in some examples, can have a wire gauge size between 16 American Wire Gauge and 24 American Wire Gauge.

These described features can help to effectively route the power transfer conduit(s) 525 through the hinge assembly 500. In this way, the hinge assembly 500 can be used to facilitate power conveyance between a power source and a power consuming device, such as an electrically controllable optically active privacy structure coupled to the hinge assembly 500 (e.g., coupled to the second arm 510). This ability to accommodate the power transfer conduit(s) 515 can allow the power source to be located remote from both the hinge assembly 500 and the power consuming device (e.g., the electrically controllable optically active privacy structure) coupled to the hinge assembly 500.

FIG. 10 shows a bottom perspective view of the first arm first end 506 of the first arm 505. In this illustrated embodiment, the first arm first end 506 includes both the channel opening 521 and a coupling aperture 550. The channel opening 521 and the coupling aperture 550 can be at a side of the first arm 505 that is opposite a side of the first arm 505 having the pin opening 517. The channel opening 521 can be configured to receive the power transfer conduit(s) 525 and, as described previously, form a portion of the channel 520. As such, the channel opening 521, as well as the channel 520, can have a cross-sectional area greater than a diameter of the power transfer conduit(s) 525. For instance, the channel opening 521, as well as the channel 520, can have a cross-sectional area greater than a diameter of two power transfer conduits 525 (e.g., an electrical potential supply conduit and an electrical potential return conduit), as shown for the illustrated embodiment where the power transfer conduit 525 includes two electrical wires that are independently insulated. The coupling aperture 550 can be configured to receive the first arm coupling element 508 for securing the hinge assembly 500 to a support structure (e.g., a fixed support structure, such as a window frame).

FIGS. 11 and 12 show the conveyance pin 513 at the second arm second end 512 of the second arm 512. Specifically, FIG. 11 shows a side perspective view of the second arm second end 512 with the conveyance pin 513, and FIG. 12 shows a side elevational view of the conveyance pin 513 with the second arm 510 removed for convenience of illustration.

The conveyance pin 513 can be configured to receive and output the power transfer conduit(s) 525 from the hinge assembly 500. In the illustrated embodiment, the conveyance pin 513 defines the second arm second channel directional change portion 543, at least in part, as well as the second arm second end channel portion 544 and the channel opening 522.

The power transfer conduit(s) 525 can change elevation at the conveyance pin 513. Namely, the conveyance pin 513 can be configured to receive the power transfer conduit(s) 525, at the second arm second channel directional change portion 543, at a first elevation. And, the conveyance pin 513 can be configured to output the power transfer conduit(s) 525 from the conveyance pin 513 at a second elevation that is different from the first elevation. The power transfer conduit(s) 525 can change elevation from the first elevation to the second elevation where the power transfer conduit(s) 525 extend along a longitudinal axis 560 of the conveyance pin 513.

In addition, the power transfer conduit(s) 525 can change orientation at the conveyance pin 513. Namely, the conveyance pin 513 can be configured to receive the power transfer conduit(s) 525, at the second arm second channel directional change portion 543, at a first orientation (e.g., a horizontal orientation perpendicular to the axis 560). And, the conveyance pin 513 can be configured to output the power transfer conduit(s) 525 from the conveyance pin 513 at a second orientation (e.g., a vertical orientation parallel to, or extending along, the axis 560) that is different from the first orientation. In some such examples, the conveyance pin 513 can be configured to route the power transfer conduit(s) 525 to cause the change in orientation, and elevation, of the power transfer conduit(s) 525 where the power transfer conduit(s) 525 intersect the axis 560.

FIG. 13 is perspective view of the privacy glazing structure 12 coupled to the hinge assembly 500. As described previously, the power transfer conduit(s) 525, of the hinge assembly 500, can be electrically coupled to the electrically controllable optically active material 18, of the privacy glazing structure 12, to form, at least in part, an electrically dynamic system. In the embodiment illustrated at FIG. 13, the privacy glazing structure 12 and the hinge assembly 500 form a casement window which can be included as part of the electrically dynamic system. Though, in other embodiments within the scope of the present disclosure, the privacy glazing structure 12 and the hinge assembly 500 can form other types of movable windows or doors, including an awning window, hopper window, or other movable window or door, any of which can be included as part of the electrically dynamic system.

In operation, in addition to the hinge assembly 500 being configured to convey power to and/or from the privacy glazing structure 12, via the power transfer conduit(s) 525, the hinge assembly 500 can be configured to move the privacy glazing structure 12. As shown in the example of FIG. 13, the second arm 510 can be coupled to the privacy glazing structure 12 (e.g., at the frame 30) and the first arm 505 can be coupled to a support structure 601 (e.g., a frame or other structure at a wall). More specifically, in the illustrated casement window embodiment shown here, the first arm 505 is coupled to the support structure 601 via a carrier 600. In some such embodiments, the first arm 505 can be rotatably coupled to the support structure 601 (e.g., via a rotatable coupling of the first arm 505 at the carrier 600) such that the first arm 505 can rotate relative to the support structure 601 (e.g., rotate relative to the carrier 600). For the illustrated casement window embodiment, the hinge assembly 500 can be configured to move the privacy glazing structure 12 in a direction 605 such that the privacy glazing structure 12 can rotate between a first position at, or adjacent, the support structure 601 and a second position, such as that shown in FIG. 13, away from the support structure 601. As the privacy glazing structure 12 moves from the first position toward the second position, the carrier 600 can slide, relative to the support structure 601, in a direction 610 and, thereby, move the first arm 505 that is coupled to the carrier 600. As the carrier 600 slides in the direction 610, the resulting movement of the first arm 505 can cause the second arm 510 to rotate relative to the first arm 505 via the rotatable pin coupling 515.

Notably, as described elsewhere in this disclosure, the hinge assembly 500 can be configured to move the privacy glazing structure 12 while also conveying power to and/or from the privacy glazing structure 12 via the power transfer conduit(s) 525 at the hinge assembly 500. Namely, the power transfer conduit(s) 525 can be received at the hinge assembly 500 and coupled to the privacy glazing structure 12 at the second arm 510. Thus, as the privacy glazing structure 12 moves between the first and second positions in the direction 605, the hinge assembly 500 can be configured to convey power to and/or from the privacy glazing structure 12, via the power transfer conduit(s) 525, in each of the positions.

Various examples have been described. These and other examples are within the scope of the following claims.

What is claimed is:

1. A hinge assembly comprising:
a first arm defining a first portion of a channel, the first arm configured to rotatably couple to a support structure about a first axis;
a second arm defining a second portion of the channel;
a rotatable pin coupling that rotationally couples the second arm to the first arm, wherein the rotatable pin coupling is configured such that as the first arm rotates about the first axis the second arm rotates about a rotational axis that is defined at the rotatable pin coupling, the rotatable pin coupling defining a third portion of the channel; and
a power transfer conduit extending through the first portion of the channel at the first arm, the third portion of the channel at the rotatable pin coupling, and the second portion of the channel at the second arm.

2. The assembly of claim 1, wherein the second arm is configured to couple to a privacy glazing structure, and wherein the rotatable pin coupling is configured to allow rotation of the second arm relative to the first arm about the rotational axis that is defined at the rotatable pin coupling.

3. The assembly of claim 2, wherein the power transfer conduit extends along the rotational axis as the power transfer conduit extends through the third portion of the channel at the rotatable pin coupling.

4. The assembly of claim 3, wherein the power transfer conduit changes elevation relative to the rotational axis as the power transfer conduit extends along the rotational axis.

5. The assembly of claim 4, wherein the rotatable pin coupling comprises a first pin and a second pin that is coupled to the first pin, and wherein the power transfer conduit extends within each of the first pin and the second pin as the power transfer conduit extends along the rotational axis.

6. The assembly of claim 3, wherein the power transfer conduit extends through the first arm at a first orientation that is perpendicular to the rotational axis, extends through and within the rotatable pin coupling at a second orientation that is perpendicular to the first orientation, and extends through the second arm at the first orientation that is perpendicular to the rotational axis.

7. The assembly of claim 3, wherein the power transfer conduit exits the first portion of the channel at the first arm and enters the third portion of the channel at the rotatable pin coupling at a first angular orientation, relative to the rotational axis, and wherein the power transfer conduit exits the third portion of the channel at the rotatable pin coupling and enters the second portion of the channel at the second arm at a second angular orientation, relative to the rotational axis, that is different than the first angular orientation.

8. The assembly of claim 1,
wherein the first arm includes a first arm length, a first arm height, and a first arm width, wherein the first arm length is at least two times greater than each of the first arm height and the first arm width, and
wherein the second arm includes a second arm length, a second arm height, and a second arm width, wherein the second arm length is at least two times greater than each of the second arm height and the second arm width.

9. The assembly of claim 1,
wherein the first portion of the channel defined at the first arm includes a first channel opening and a first arm first end channel portion extending in a first direction, a first arm mid-channel portion extending in a second direction that is different than the first direction, and a first arm first channel directional change portion interconnecting the first arm mid-channel portion to the first arm first end channel portion, and
wherein the second portion of the channel defined at the second arm includes a second channel opening and a second arm second end channel portion extending in the first direction, a second arm mid-channel portion extending in the second direction that is different than the first direction, and a second arm second channel directional change portion interconnecting the second arm mid-channel portion to the second arm second end channel portion.

10. The assembly of claim 9, wherein the first channel opening and the first arm first end channel portion are oriented at an obtuse angle relative to the first arm mid-channel portion, and wherein the second channel opening and the second arm second end channel portion are oriented at an obtuse angle relative to the second arm mid-channel portion.

11. The assembly of claim 1, wherein the power transfer conduit comprises at least two electrical wires that are independently insulated.

12. The assembly of claim 1, wherein the first arm further comprises a channel opening and a coupling aperture at an end portion of the first arm opposite the rotatable pin coupling, wherein the channel opening forms at least a part of the first portion of the channel and is configured to receive the power transfer conduit, and wherein the coupling aperture is configured to receive a first arm coupling element for securing the hinge assembly to a support structure.

13. An electrically dynamic system comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer; and
a hinge assembly comprising:
a first arm defining a first portion of a channel, the first arm configured to rotatably couple, about a first axis, to a support structure for the first pane of transparent material and the second pane of transparent material;
a second arm defining a second portion of the channel;
a rotatable pin coupling that rotationally couples the second arm to the first arm,
wherein the rotatable pin coupling is configured such that as the first arm rotates about the first axis the second arm rotates about a rotational axis that is defined at the rotatable pin coupling, the rotatable pin coupling defining a third portion of the channel; and
a power transfer conduit extending through the first portion of the channel at the first arm, the third portion of the channel at the rotatable pin coupling, and the second portion of the channel at the second arm,
wherein the power transfer conduit is electrically coupled to the electrically controllable optically active material.

14. The system of claim 13, wherein the first pane of transparent material, the second pane of transparent material, and the electrically controllable optically active material are coupled to the second arm.

15. The system of claim 14, wherein the rotatable pin coupling is configured to allow rotation of the second arm relative to the first arm about a rotational axis that is defined at the rotatable pin coupling.

16. The system of claim 15, wherein the power transfer conduit extends along the rotational axis as the power transfer conduit extends through the third portion of the channel at the rotatable pin coupling, and wherein the power transfer conduit changes elevation relative to the rotational axis as the power transfer conduit extends along the rotational axis.

17. The system of claim 16, wherein the power transfer conduit extends through the first arm at a first orientation that is perpendicular to the rotational axis, extends through and within the rotatable pin coupling at a second orientation that is perpendicular to the first orientation, and extends through the second arm at the first orientation that is perpendicular to the rotational axis.

18. The system of claim 16, wherein the power transfer conduit exits the first portion of the channel at the first arm and enters the third portion of the channel at the rotatable pin coupling at a first angular orientation, relative to the rotational axis, and wherein the power transfer conduit exits the third portion of the channel at the rotatable pin coupling and enters the second portion of the channel at the second arm at a second angular orientation, relative to the rotational axis, that is different than the first angular orientation.

19. The system of claim 13,
wherein the first arm includes a first arm length, a first arm height, and a first arm width, wherein the first arm length is at least two times greater than each of the first arm height and the first arm width, and
wherein the second arm includes a second arm length, a second arm height, and a second arm width, wherein the second arm length is at least two times greater than each of the second arm height and the second arm width.

20. An electrically dynamic system comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer;
a first hinge assembly comprising:
a first arm defining a first portion of a channel;
a second arm defining a second portion of the channel;
a rotatable pin coupling that rotationally couples the second arm to the first arm, the rotatable pin coupling defining a third portion of the channel; and
a power transfer conduit extending through the first portion of the channel at the first arm, the third portion of the channel at the rotatable pin coupling, and the second portion of the channel at the second arm,
wherein the power transfer conduit is electrically coupled to the electrically controllable optically active material; and
a second hinge assembly coupled to a support structure on one side and coupled to a frame that supports the first pane of transparent material and the second pane of transparent material on an opposite side.

* * * * *